US007702689B2

(12) United States Patent
Forstmann et al.

(10) Patent No.: US 7,702,689 B2
(45) Date of Patent: Apr. 20, 2010

(54) SYSTEMS AND METHODS FOR QUERYING METAMODEL DATA

(75) Inventors: Gerd Forstmann, Nussloch (DE); Johannes Lauterbach, Heidelberg (DE)

(73) Assignee: SAP AG, Walldorf (DE)

( * ) Notice: Subject to any disclaimer, the term of this patent is extended or adjusted under 35 U.S.C. 154(b) by 281 days.

(21) Appl. No.: 11/485,363

(22) Filed: Jul. 13, 2006

(65) Prior Publication Data

US 2008/0016033 A1   Jan. 17, 2008

(51) Int. Cl.
*G06F 7/00* (2006.01)
*G06F 17/30* (2006.01)

(52) U.S. Cl. .................................... 707/773
(58) Field of Classification Search ............... None
See application file for complete search history.

(56) References Cited

U.S. PATENT DOCUMENTS

| | | | | |
|---|---|---|---|---|
| 6,018,749 | A * | 1/2000 | Rivette et al. | 715/202 |
| 6,219,670 | B1 * | 4/2001 | Mocek et al. | 707/102 |
| 6,279,007 | B1 * | 8/2001 | Uppala | 707/101 |
| 6,567,812 | B1 * | 5/2003 | Garrecht et al. | 707/100 |
| 2002/0129026 | A1 * | 9/2002 | Reardon | 707/10 |
| 2004/0059530 | A1 * | 3/2004 | Paulse et al. | 702/76 |
| 2004/0098380 | A1 * | 5/2004 | Dentel et al. | 707/3 |
| 2004/0153185 | A1 * | 8/2004 | Tamura et al. | 700/97 |
| 2005/0097092 | A1 * | 5/2005 | Annau et al. | 707/3 |
| 2005/0278368 | A1 * | 12/2005 | Benedikt et al. | 707/101 |
| 2005/0289184 | A1 | 12/2005 | Dettinger et al. | |
| 2006/0041661 | A1 | 2/2006 | Erikson et al. | |

OTHER PUBLICATIONS

Wu, Jie et al., "ATRAM-An Analysis Tool of Requirement and Architecture Management", IEEE International Conference on Systems, Man and Cybernetics Conference Proceedings, 5(5): 2654-2660 (2003).
Reveliotis, P. et al., "Your Enterprise on XQuery and XML Schema: XML-based Data and Metadata Integration", Data Engineering Workshops Proceedings, pp. 80-89 (Apr. 3, 2006).
Hearnden, David et al., "MQL: A powerful Extension to OCL for MOF Queries", Enterprise Distributed Object Computing Conference Proceedings, pp. 264-276 (Sep. 16, 2003).

* cited by examiner

*Primary Examiner*—Khanh B Pham
*Assistant Examiner*—Azam Cheema
(74) *Attorney, Agent, or Firm*—Mintz, Levin, Cohn, Ferris, Glovsky & Popeo, P.C.

(57) ABSTRACT

A system and method for querying metamodel data is provided. In one embodiment, the method includes receiving, at a computer, a query indicator, the query indicator defining a type of query for a value in the metamodel data; performing, based on the query indicator, the query for the value by searching a first set of parent and child nodes and recursively querying the metamodel data to identify the value in another set of parent and child nodes; and providing, as a result, the value and at least one of the nodes from the sets of parent and child nodes.

12 Claims, 5 Drawing Sheets

SYSTEMS AND METHODS FOR QUERYING METAMODEL DATA

FIELD OF THE INVENTION

The present invention generally relates to data processing. More particularly, the present invention relates to systems and methods for querying data, such as data structured in a hierarchical format.

BACKGROUND OF THE INVENTION

A metamodel is a data model that selects and structures the data for a specific purpose. By selecting specific data and viewing it in a specific way, the metamodel can decrease the time required by, and eliminate unnecessary detail from, an activity. For example, consider an aerial photograph that shows every road, street, driveway, and backyard swimming pool in a given geographical area. This view, or metamodel, might be quite valuable in observing changes to a neighborhood over time. In contrast, a street map of the same area might be an excellent metamodel for a tourist trying to find a particular address, and an aeronautical chart may help a private pilot pinpoint her destination airport. The underlying information or data (in this case, every physical thing in the geographical area) is exactly the same, but each metamodel (the aerial photograph, the street map, and the aeronautical chart) provides a different view of the data that is selected (e.g., no backyard swimming pools on the aeronautical chart) and structured (e.g., street names printed and major roads shown in color on the street map) to facilitate a specific purpose. Imagine how cumbersome it might be for tourists to find their way around with an aerial photograph. Thus, the metamodel eliminates unnecessary data from the view and provides more rapid access and processing of the information.

The metamodel may serve as a schema (i.e., structured framework or plan) for storing and organizing data—enabling the schema to define the organization of the data. For example, the metamodel may organize the data in a tree-like, hierarchical structure. In this type of structure, a piece of data is referred to as a "node," and nodes may be defined to have relationships (also referred to as associations, links, or paths) that link nodes to each other. For example, nodes may be referred to as parent nodes and child nodes. The parent node may be related to one or more child nodes. Moreover, the parent node may be higher in the hierarchy than a child node. For example, in a customer database, customer information may be organized as a parent node and a sales order associated with the customer may be organized as a child node. The child node, in this example a sales order, includes sales order information, such as products ordered, product descriptions, delivery dates, ship dates, and the like. In a metamodel, the relationship between a two nodes is given an explicit name (e.g., "ExecutedOrders") which can then be used to refer to all node sets related in the same way. This is referred to as a "named relationship". As used herein, the phrase "metamodel data" refers to data organized according to a schema or plan.

Metamodel data may be stored in a database to allow a user to perform a query of the metamodel data. A query is the primary mechanism for retrieving information from a database and consists of questions presented to the database in a predefined format. For example, some databases use the Structured Query Language (SQL) to retrieve metamodel data or portions of that data. XPath is a query language which is used to perform queries on XML (eXtensible Markup Language) documents. XPath may also be adapted for use with metamodel data. XML is an extensible markup language which is used to describe data.

Past approaches for querying data, which can be used with metamodel data, may be limited in the types of queries that can be performed. In particular, these approaches may only allow the computer to access data according to the named relationships (or associations) that are defined in the metamodel. For example, in a metamodel that identifies a human and a pet living in each house on a street with the named relationship name "HumansPets", the computer may identify the pets living with the human "Bob" because the named relationship of "HumansPets" is defined in the metamodel and specified in the query. However, using past query tools, the computer would not be able to identify the pets living next door to the human "Bob" because the metamodel did not define the neighbors, only "HumansPets" and the query can only search on specified named relationships. If a relationship between two pieces of data (or nodes) is not defined in the metamodel, there may be no way of accessing the data in a query. In addition, querying data may only be executed in one direction, such as from a parent node to a child node using the defined and named relationship between the nodes. Querying the data from a child node to a parent node may not be possible using past approaches to querying a metamodel. Also, past approaches may require the computer system to test every piece of data to determine if it answers the query. Moreover, there may be no mechanism to stop the query process once a positive result is reached (i.e., a result that answers the query). In addition, it may be necessary at times for an application to call itself to complete a query. This type of recursive query may not be possible with past approaches. In view of the foregoing, there is a need to improve past approaches of accessing data associated with a metamodel.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

SUMMARY OF THE INVENTION

Systems, methods, and articles of manufacture consistent with the invention perform queries on metamodel data.

In one exemplary embodiment, there is provided a method for querying metamodel data to form sets of parent and child nodes. In one embodiment, the method includes receiving, at a computer, a query indicator, the query indicator defining a type of query for a value in the metamodel data; performing, based on the query indicator, the query for the value by searching a first set of parent and child nodes and recursively querying the metamodel data to identify the value in another set of parent and child nodes; and providing, as a result, the value and at least one of the nodes from the sets of parent and child nodes.

In another exemplary embodiment, there is provided a method for querying metamodel data to form sets of parent and child nodes. In one embodiment, the method includes receiving, at a computer, a query indicator, the query indicator defining a type of query for a value in the metamodel data; performing, based on the query indicator, the query for the value by searching a set of parent and child nodes and reverse querying the metamodel data to identify the value of the parent node based on the child node; and providing, as a result, the value and at least one of the nodes from the sets of parent and child nodes.

In another exemplary embodiment, there is provided a method for querying metamodel data to form sets of parent and child nodes. In one embodiment, the method includes receiving, at a computer, a query indicator, the query indicator defining a type of query for a value in the metamodel data; performing, based on the query indicator, the query for the value by searching the metamodel data using named relationships to identify the value in a set of parent and child nodes; and providing, as a result, the value and at least one of the nodes from the sets of parent and child nodes.

It is to be understood that both the foregoing general description and the following detailed description are exemplary and explanatory only and are not restrictive of the invention, as described. Further features and/or variations may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the present invention and help to explain some of the principles associated with the invention. In the drawings.

DESCRIPTION OF THE EMBODIMENTS

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1:
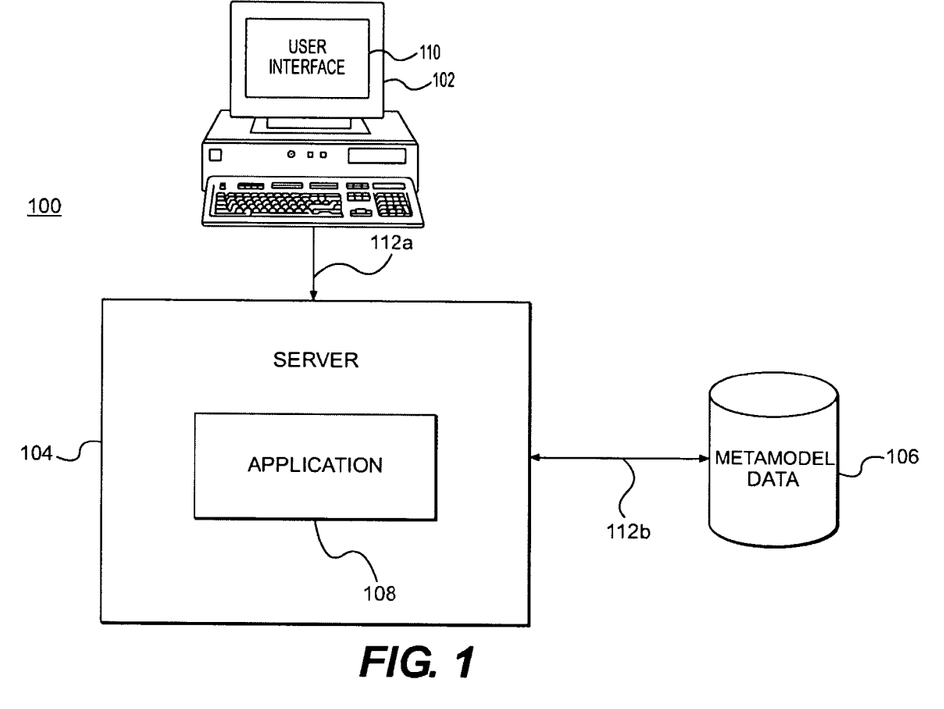
FIG. 1 is a block diagram of an exemplary system consistent with certain aspects related to the disclosed invention.

FIG. 1 depicts a block diagram of an exemplary system environment 100 for querying metamodel data. The metamodel data may be implemented as data structured to form sets of parent and child nodes.

System 100 includes a client 102, metamodel data 106, a server 104, and network connections 112a and 112b. Client 102 may further include a user interface 110, while server 104 may further include an application 108 to access and then query metamodel data 106.

Client 102 may be implemented as a processor, such as a computer, to interface with server 104 through network connection 112a. Client 102 may include a monitor, a keyboard device, a network interface, memory, storage, and any other hardware and software suitable for use with a processor, such as a computer. Client 102 may also include user interface 110 to allow a user to interact with an application, such as application 108 at server 104. The user interface 110 may be implemented as a graphical user interface, such as a browser, JAVA applet, and the like, to allow the user to interact with application 108 by issuing commands to application 108. The user may consist of a human operator or a computer-implemented process. In some implementations, SAP Web Dynpro (commercially available from SAP AG, Walldorf, Germany) is used as a model-based development environment for generating a user interface, although other development environments may also be used to develop the user interface.

The metamodel data 106 may include data stored in a database or other suitable storage structure. The metamodel may serve as a schema for storing data in metamodel data 106 and as a language that supports actions, such as queries, of metamodel data 106. Data may have a value, such as a numerical quantity, that defines the content of the data. Additional examples of metamodel data 106 will be provided below with respect to FIGS. 3-5.

Server 104 may be implemented as a processor, such as a computer, to interface with client 102 through network connection 112a. Server 104 may also interface to metamodel data 106 through network connection 112b. Moreover, server 104 may include application 108 for executing queries of metamodel data 106. Application 108 may be implemented as XSLT (Extensible Stylesheet Language Transformation), XPointer, or any other type of computer program that is capable of executing a query based on a query indicator to selectively retrieve data from, for example, metamodel data 106.

The network connection 112a and 112b allow communication between the components of the system. Network connections 112a and 112b may include, alone or in any suitable combination, a telephony-based network, a local area network (LAN), a wide area network (WAN), a dedicated intranet, wireless LAN, the Internet, an intranet, a wireless network, a bus, or any other communication mechanisms. Further, any suitable combination of wired and/or wireless components and systems may provide network connections 112a and 112b. Moreover, network connections 112a and 112b may be embodied using bi-directional, unidirectional, or dedicated communication links. Network connections 112a and 112b may also implement standard transmission protocols, such as Transmission Control Protocol/Internet Protocol (TCP/IP), Hyper Text Transfer Protocol (HTTP), SOAP, RPC, or other protocols.

System 100 for querying metamodel data may be applicable to any use that includes querying data stored or viewed in a hierarchical structure, such as metamodel data 106 or any other form of data organized according to a structure or schema. Although system 100 is described in this example as a client-server based system, system 100 may be implemented with any other computer architecture or framework. Moreover, although FIG. 1 depicts only a single client 102, metamodel data 106, server 104, and user interface 110, a plurality of such elements may be implemented.

Figure 2:
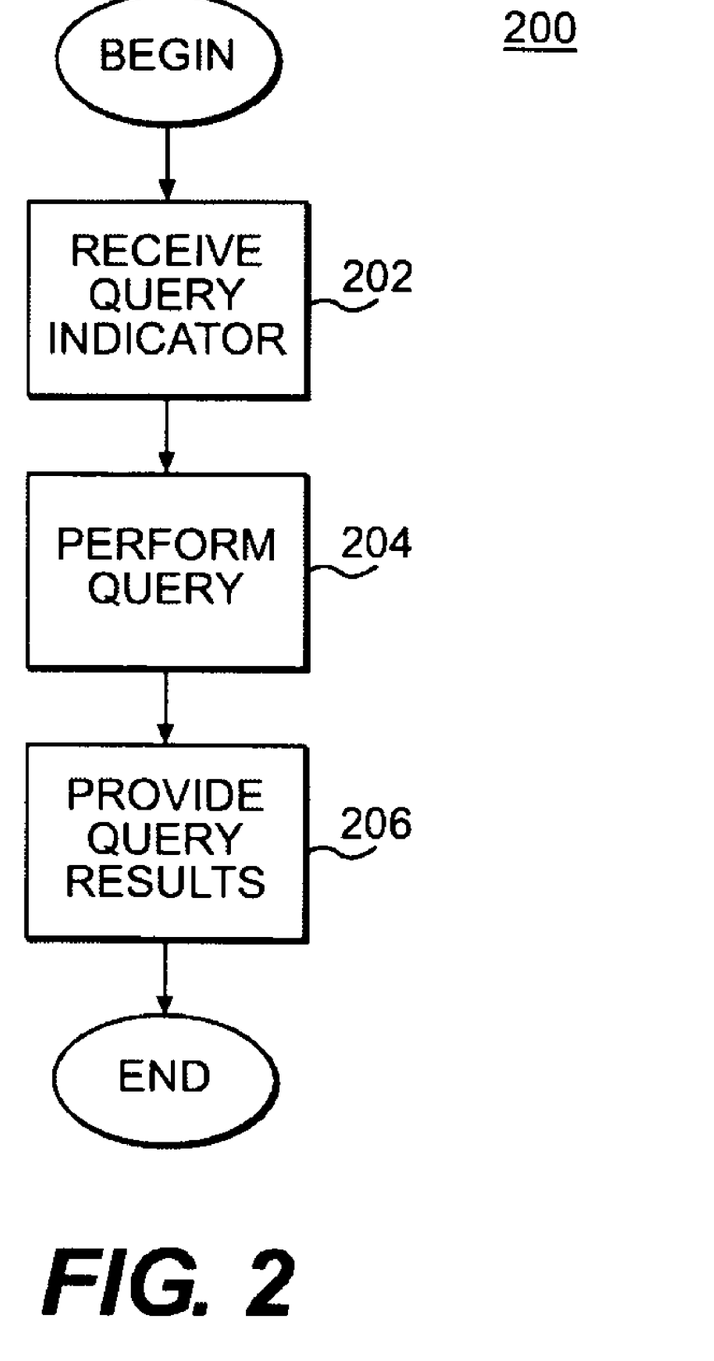
FIG. 2 is another block diagram of an exemplary method consistent with certain aspects related to the present invention.

FIG. 2 shows a flow chart including exemplary steps 200 for querying metamodel data. Referring to FIGS. 1 and 2, server 104 may receive a query indicator from user interface 110 (step 202). The query indicator defines the type of query to be performed on metamodel data 106 and includes the value being queried in metamodel data 106. In various embodiments the query indicator defines the type of query to be performed as a recursive query, a reverse query, or a relationship query, all of which are described further below with respect to FIGS. 3-5. Moreover, the query indicator may include a value, such as a part number, to be queried in the metamodel data 106. Server 104 may then perform the query of metamodel data 106 using the query indicator and the value received in step 204. Once the query identifies a result (e.g., finds the value in the metamodel data 106), server 104 may then provide any results from the query to user interface 110 at client 102 (step 206).

In step 202, server 104 may receive the query indicator from client 102 and/or user interface 110 through network connection 112a. The query indicator may be received as part of a SOAP (Simple Object Access Protocol) message from user interface 110; however, any other approach may be used to communicate the query indicator from user interface 110 to server 104 and application 108. The query indicator may be implemented as a notation that is used to define the type of query to be performed by server 104 on metamodel data 106. For example, the query indicator may specify a recursive query, a reverse query, or a relationship query, all of which are described further below with respect to FIGS. 3-5. In some cases, the query indicator is formatted to be consistent with XPath or any other notation system that allows retrieval of metamodel data or any other data stored in accordance with a schema or structure. In addition to the query indicator, user interface 110 may also provide the value to be queried in metamodel data 106. For example, a user at user interface 110 may initiate a query of metamodel data 106 by providing to user interface 110 a query indicator specifying the type of query to be performed, such as a recursive query, on metamodel data 106 and by including the value, such as "part #102," to be queried and identified in metamodel data 106. In this example, application 108 at server 104 receives the query indicator and value, i.e., recursive query for part #102.

To perform a query (step 204), server 104 may invoke application 108. Once invoked, application 108 queries metamodel data 106 based on the query indicator. For example, if the query indicator corresponds to a recursive query, application 108 may search a first set of parent and child nodes of metamodel data 106 for a value and recursively query metamodel data 106 until the value is identified. If the query indicator corresponds to a reverse query, application 108 may search child nodes until a result is obtained and then identify the parent node for that child node. If the query indicator corresponds to a relationship query, application 108 may search all nodes according to the named relationships between parent and child nodes defined in the metamodel data. The recursive query, reverse query, and relationship queries are each described further below.

Any results of the query are provided by server 104 to client 102 and/or user interface 110 for presentation to a user (step 206). Moreover, server 104 may provide the results to client 102 and/or user interface 110 in the form of a message, such as a SOAP message. In some implementations, any results of the query may be used as input to additional executions of the method 200 or as input to other computer-implemented processes.

The following examples further illustrate the use of a query indicator to implement either a recursive query, reverse query, or relationship query on data, such as metamodel data 106.

Recursive Query

To perform a query of metamodel data 106, application 108 may begin querying metamodel data 106. Application 108 may call itself to complete the query of metamodel data 106. This type of query is considered a recursive query. By calling itself to complete the query, application 108 is querying metamodel data 106 recursively. Recursion refers to a technique where a function, such as a query, calls itself in order to accomplish a task. System and methods consistent with the present invention may implement a query indicator to define that a recursive query of data, such as metamodel data 106, should be accomplished.

Figure 3:
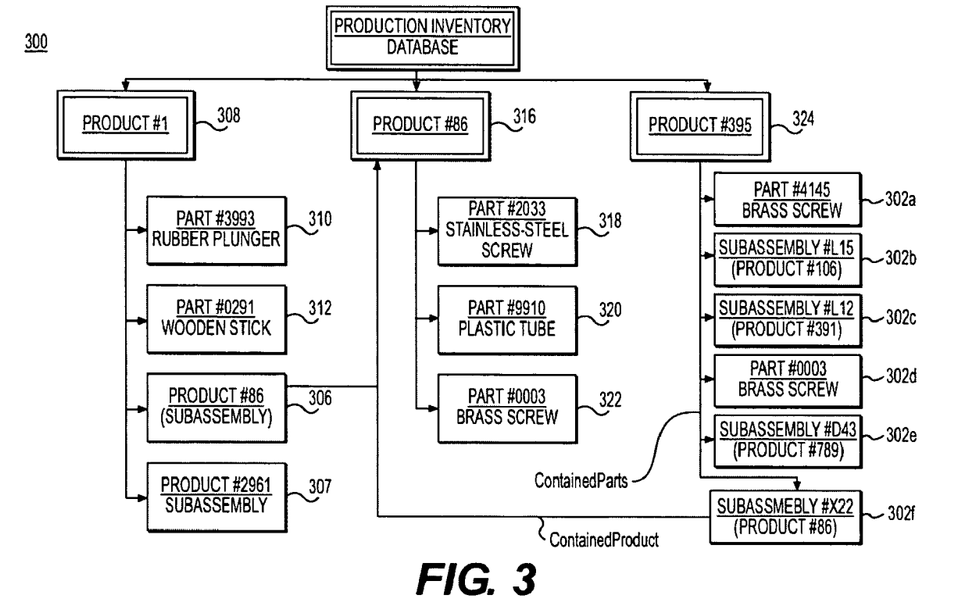
FIG. 3 is another exemplary depiction of metamodel data consistent with certain aspects related to the present invention.

The use of a recursive query can be illustrated by example. FIG. 3 shows a portion of exemplary metamodel data 300, which may be included within metamodel data 106. Metamodel data 300 includes, for example, components 302a-f, such as part #4145, part #106, part #391, part #0003, part #789, and part #86, all of which are parts included within a product #395 324. Moreover, product 324 may be considered a parent node with associated child nodes corresponding to components 302a-f with a relationship named "Contained-Parts". The metamodel data 300 may include, for example, all of the products (parent nodes) made by an exemplary company. The metamodel data 300 may also include, for example, all of the components which are used to manufacture each product (child nodes). These components may be discrete parts (such as a brass screw 302a, a plastic tube 320 or a wooden stick 312) or subassemblies (e.g., 302b, 306, and 307), that is products made from other components. Examples of subassemblies might include a motor, a mechanical door, and a fuel filter. The subassemblies may be implemented as products in the metamodel data 300. For example, Product #1 308 is made up of four components 310, 312, 306, and 307. Components indicated by 310 and 312 are discrete parts, namely Part #3993, a Rubber Plunger, and Part #0291, a wooden stick. Components indicated by 306 and 307 are subassemblies. Product #86 306 is a subassembly and Product #2961 307 is a subassembly. The components indicated by 306 (Product #86) are also implemented in the metamodel data 300 as a parent node 316 with three components 318, 320, and 322. Thus, a subassembly may also be a product.

In order to determine all of the components included within a particular product, such as product #1 308, application 108 may first call the metamodel data 300 to query for all of the components of product #1 308. During the query, application 108 may call itself to make another query for the components of product #86 306 since that product is a subassembly with corresponding components (i.e., parts of its own). In this example, application 108 makes a call to itself to query for the parts of product #86, the query identifies component 316 (labeled part #86), which in this case returns components 318-322 (corresponding to part numbers 2033, part #9910, and part #0003). In the above example, a recursive query is performed when application 108 calls itself to complete the task of querying for all of the components of product #1 308.

To illustrate another example of a recursive query, suppose a defect was discovered in a brass screw and there was a need to query for every product that contained a brass screw. Beginning with product #1 308, application 108 at server 104 would perform a recursive query, as described above with respect to step 204, for "brass screw" and thus consider each component in the metamodel data 300 associated with product #1 308 (i.e., every component below product #1, such as components 310, 312, 306, and 307). In this example, application 108 would find part #3993 310 (a rubber plunger) and part #0291 312 (a wooden stick). Neither of these is a brass screw. Next, application 108 would find a subassembly 306, which is product #86. In order to find out what components are used to make product #86, application 108 determines that product #86 is a subassembly based on information contained in component 306 and then calls itself to query for product #86. That second query identifies product #85 316, which includes components, including a brass screw 322. Using a recursive query, application 108 has thus identified a brass screw at product #86 which is a component of product #1 308.

The positive result identifying product #1 308, which includes the brass screw (part #0003 322) as part of product number may be provided to user interface 102 at step 206. If a product includes a plurality of subassemblies, application 108 would perform a recursive query for each subassembly to identify the related components.

Moreover, application 108 may query each product 308, 316, and 324 in metamodel data 300 for a brass screw. When application 108 evaluates product #395 324, application 108 may determine that product #395 324 includes a brass screw 302a. Since this is a positive result, application 108 may stop querying for the brass screw and not continue its query for the brass screw against any remaining components 302b-f. The application 108 has thus identified product #395 324 as a product that includes a brass screw and provides the positive result as an output in step 206.

In some implementations, application 108 may determine that product #86 316 has already been queried and a brass screw was identified (e.g., part #0003 322). When that is the case, application 108 may determine that another query of product #86 316 is not necessary.

In various embodiments a query indicator is implemented to perform the recursive query (step 204), as described above with respect to FIG. 3. Returning to the example above, the following query expression would return a list of products including a "brass screw".

//Product[{SubAssembly/Product/}Part[@Part
  Name="brass screw"]]/}@ProductNumber The left and right curly brackets (i.e., { ... }) represent the query indicator enabling application 108 to perform a recursive query until a positive result is found and that no node should be queried more than once. Note that the expression "{SubAssembly/Product/}" describes the recursion and describes that the recursion happens from parent to child to parent to child, and so on (e.g., product to part (subassembly) to product to part and so on).

A more generic expression of the query indicator for recursive query is as follows:

{ParentNodeName[{ChildNodeName/ParentNodeName/
  }ChildNodeName[Field=("QueryCriteria")]]/@Re-
  turnedDatumName ParentNodeName represents the name of the top level node to be queried ("Product" in the example metamodel data 300); ChildNodeName represents the name of the node to be tested ("Part" in the example 300); Field represents the data field to be tested ("Part Name" in the example 300); QueryCriteria represents the value that is being selected ("brass screw" in this example); and ReturnedDatumName represents the data field that is to be included in the output when a positive result is found ("Product Number" in the example above).

Reverse Query

In another embodiment consistent with the present invention, application 108 may perform a reverse query of metamodel data using a query indicator. A reverse query would perform a query in a reverse direction (i.e., from a child node to a parent node).

Figure 4:
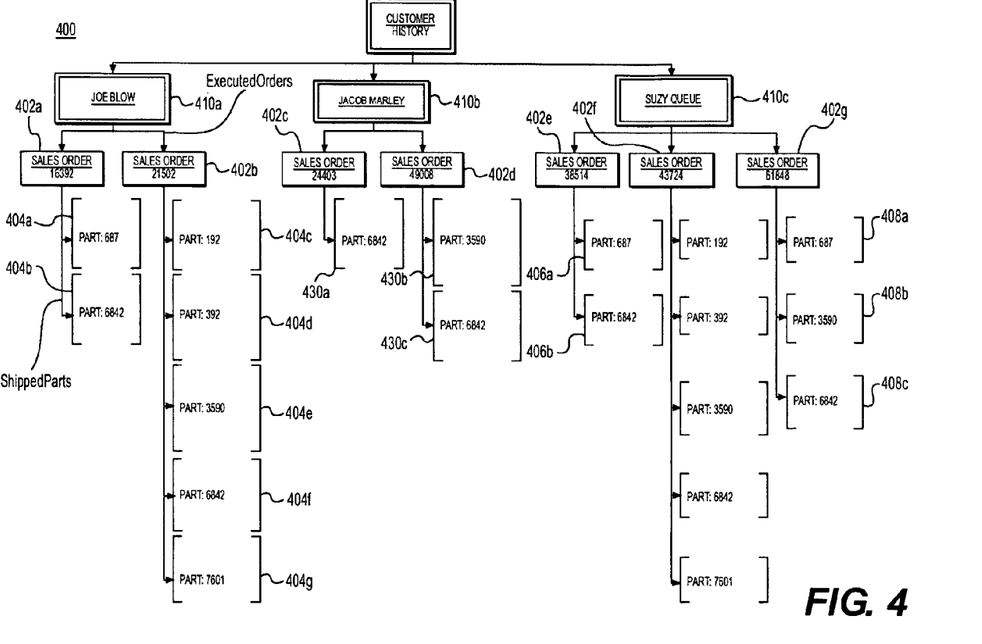
FIG. 4 is another exemplary depiction of metamodel data consistent with certain aspects related to the present invention.

FIG. 4 shows an exemplary data set 400 which may be included as part of metamodel data 106. Metamodel data 400 includes parent nodes, such as customers 410a-c and child nodes, such as sales orders 402a-g. Each parent node, such as customer 410a, may be associated with one or more child nodes, such as sales orders 402a-b. This relationship may be given a name such as "ExecutedOrders" Moreover, child nodes, such as child node 402a, may also be associated with corresponding child nodes, such as part numbers 404a-b. This relationship may be given a name such as "Shipped-Parts" Parent node 410a and child nodes 402a-b as well as child nodes 404a-g may be considered a first set of parent and child nodes; and parent node 410b and child nodes 402c-d as well as child nodes 430a-c may be considered another set of parent and child nodes. To perform a reverse query, application 108 would query all parts to identify all customers that ordered that part. This is an example of a reverse query since application 108 would begin the query at the child node, such as parts 404a-g, and then identify any parent nodes, such as customer node 410a, having that part.

By way of example, suppose a company elected to promote an add-on product to every customer who had ordered part #687. Instead of starting with the sales order and testing each part to determine if part #687 was included, application 108 may perform the query (e.g., step 204) on all of the child nodes, which in this example corresponds to parts 404a-g. When application 108 identifies part #687, application 108 would traverse up the relationship between part #404a through sales order 402a to identify customer 410a. In this example, the reverse query would query part #687 at nodes 404a and identify parent node 410a (labeled "Joe Blow"), query part #687 at node 406a and identify parent node 410c (labeled "Suzy Queue"), and query part #687 at node 408a and identify parent node 410c (labeled "Suzy Queue"). In some implementations, application 108 ceases searching for parts associated with a parent node when a positive outcome is determined. For example, when application 108 queries for part #687 and finds node 406a, node 406b may not be searched. Instead, application may proceed to query other child nodes.

In an embodiment consistent with aspects of the present invention, a query indicator is implemented to perform a reverse query (step 204), as described above with respect to FIG. 4. The application 108 may perform a reverse query from a child node to a parent node and cease the query of the child nodes associated with that parent node when there is a positive result to the query. Returning to the example above, application 108 may implement the following query expression and would return any parent nodes, such as customers 410a-c, who had sales orders including part #687:

Part("687")/>ShippedParts<::Order/>ExecutedOrders</
  @CustomerName

The greater-than and less-than signs (i.e., > ... <) represent a query indicator enabling application 108 to perform a reverse query of metamodel data.

The following provides a more generic query indicator to invoke a reverse query on a metamodel data:

ChildNodeName("QueryCriteria")/>Relationship-
  Name</@ReturnedDatumName where RelationshipName represents the name of Parent Node/Child Node set to be queried ("ShippedParts" in the example 400); ChildNodeName represents the name of the data field to be tested ("Part" in the example of metamodel data 400); QueryCriteria represents the value that is being selected ("Part #687" in the example metamodel data 400); and ReturnedDatumName represents the data field that is to be included in the output when a positive result is found ("Customer Name" in the example metamodel data 400).

Relationship Query

Figure 5:
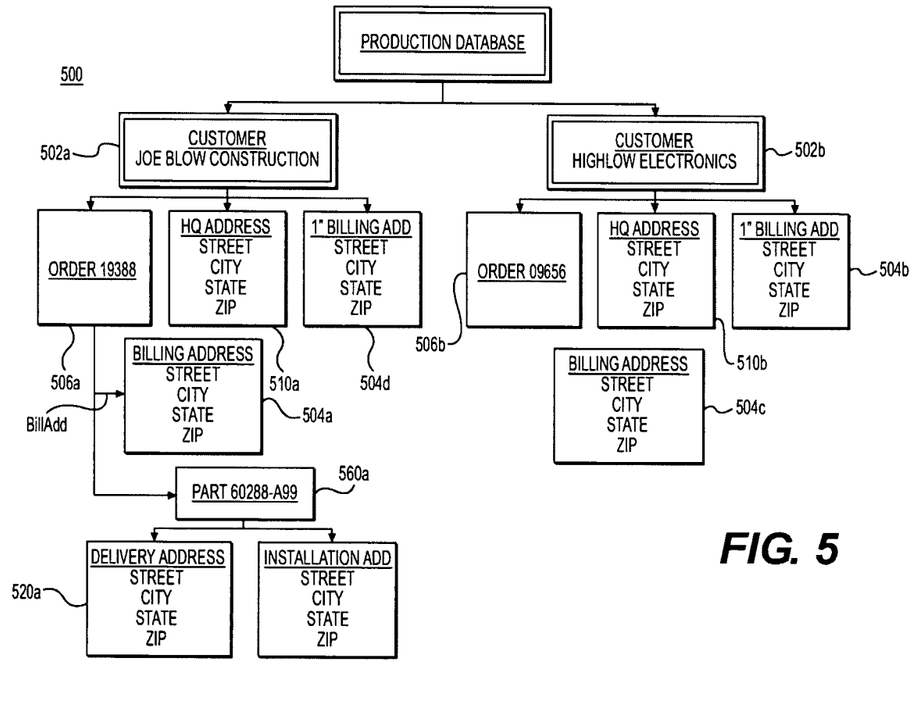
FIG. 5 is another exemplary depiction of metamodel data consistent with certain aspects related to the present invention.

In another embodiment consistent with the present invention, application 108 may perform an a relationship query of metamodel data using a query indicator. A relationship query may be used to query metamodel data using named relationships. FIG. 5 shows exemplary metamodel data 500, which may be included as part of source metamodel data 106. Metamodel data 500 includes data about production orders. It shows parent nodes, such as customers 502*a-b*, and child nodes, such as sales orders 506*a-b*, corporate address 510*a-b*, billing address 504*a-d*, and delivery address 520*a*. The solid lines between the nodes depict relationships defined as part of the metamodel data.

By way of example, application 108 may implement a relationship query to query metamodel data 500. For example, suppose there was a new tax law introduced in California. In order to determine its impact on a company, the accounting department might need a list of all things related to an address in the State of California. It might be understandable to retrieve customers with headquarters or billing addresses in California. However, it might also be necessary to identify every customer who had facilities or a subsidiary in California. Similarly, there may be a need to include parts that were delivered in California or installed there regardless of company address. Alternative approaches to querying this data would have required each and every parent-child relationship to have its own query expression. A relationship query, however, allows a search of the entire metamodel with reference to specific named relationships. For example, instead of requiring each and every relationship between a parent node and a child node (and a grand-child node and a great-grand-child node) to be iterated in the query, the single relationship between any two nodes can be named and then referred to by that name in the query.

In the given metamodel data 500, the following query expression would return a list of all things related to an address in the State of California:

//*[Address[@State="California"]]

where the notation "//*" (or two forward slashes adjacent to an asterisk) represent the query indicator enabling application 108 to perform a relationship query of metamodel data 500 and search all of the relationships in the metamodel. The notation "/" indicates that the datum to be returned is within one level of (or immediately related or connected to) the address in which "State=California".

A more generic expression of this example of the method is as follows:

//*[ChildNodeType[QueryCriteria]]

where ChildNodeType defines the type of node in which the query criteria must be found (Address in the example) and QueryCriteria is the value that is being selected or question that is being asked (State="California" in the example).

As an alternative example, in the given metamodel data 500, the following query expression would return a list of all orders billed to an address in the State of California:

<BillAdd>[@State="California"]

where the notation "<BillAdd>" (or angled brackets containing the relationship name) represents the query indicator enabling application 108 to perform a relationship query of metamodel data 500 and search the "BillAdd" relationship in the metamodel.

A more generic expression of this example of the method is as follows:

<RelationshipName>[QueryCriteria]

where RelationshipName defines the relationship in which the query criteria must be found (BillAdd in the example) and QueryCriteria is the value that is being selected or question that is being asked (State="California" in the example).

Any step of the method may be implemented with hardware, firmware, or software. Software may be web-based, written in any programming language, or utilize graphical user interfaces. Potential tools and technologies for implementing each step may become apparent to persons skilled in the art through further study of this disclosure. Components of this system, including storage of data and software may reside on any one or more computer-readable medium.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device, memory, or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

It will be apparent to those skilled in the art that various modifications and variations can be made to the system and method. For example, although FIGS. 3-5 depict specific types of metamodel data, systems and methods consistent with the present invention may be used with any other data. Other embodiments will be apparent to those skilled in the art from consideration of the specification and practice of the disclosed system and method. In addition, there are likely to be other benefits of this system as yet not understood. It is intended that the specification and examples be considered as exemplary only with a true scope being indicated by the following claims and their equivalents.

What is claimed is:

1. A method comprising:
   receiving, at an application at a computer, a query indicator for a query of metamodel data that is hierarchically structured into sets of parent and child nodes and stored in a database accessed by the application via a network connection, the query indicator comprising a type of query and a value to be queried in the metamodel data;
   performing the query, by the application and based on the query indicator, the performing of the query comprising recursive querying by the application of the sets of parent and child nodes in the metamodel data to identify a set of parent and child nodes in the metamodel data that includes the value, the application continuing to recursively call itself until a first one of the sets of parent and child nodes that includes the value to be queried is identified and ceasing to recursively call itself prior to completion of the recursive querying of all of the sets of parent and child nodes in the metamodel data, the ceasing occurring upon identification of the first one of the sets of parent and child nodes that includes the value to be queried; and providing, as a result, the value to be queried and at least one node from the one of the sets of parent and child nodes identified by the recursive query.

2. The method of claim 1, wherein receiving the query indicator further comprises receiving the query indicator in the form of a left curly brace.

3. The method of claim 1, wherein receiving the query indicator further comprises receiving the query indicator in the form of a right curly brace.

4. The method of claim 1, wherein providing the value to be queried further comprises providing the value to be queried to a user interface.

5. An article comprising a machine-readable storage device or memory encoding machine-readable code that, when executed by one or more processors, causes the one or more processors to perform operations comprising:

receiving, at an application, a query indicator for a query of metamodel data that is hierarchically structured into sets of parent and child nodes and stored in a database accessed by the application via a network connection, the query indicator comprising a type of query and a value to be queried in the metamodel data;

performing the query, by the application and based on the query indicator, the performing of the query comprising recursive querying by the application of the sets of parent and child nodes in the metamodel data to identify a set of parent and child nodes in the metamodel data that includes the value, the application continuing to recursively call itself until a first one of the sets of parent and child nodes that includes the value to be queried is identified and ceasing to recursively call itself prior to completion of the recursive querying of all of the sets of parent and child nodes in the metamodel data, the ceasing occurring upon identification of the first one of the sets of parent and child nodes that includes the value to be queried; and providing, as a result, the value to be queried and at least one node from the one of the sets of parent and child nodes identified by the recursive query.

6. The article of claim 5, wherein receiving the query indicator further comprises receiving the query indicator in the form of a left curly brace.

7. The article of claim 5, wherein receiving the query indicator further comprises receiving the query indicator in the form of a right curly brace.

8. The article of claim 5, wherein providing the value to be queried further comprises providing the value to be queried to a user interface.

9. A system comprising:

one or more processors; and one or more machine-readable storage devices or memories encoding machine-readable code that, when executed by the one or more processors, causes the one or more processors to perform operations comprising:

receiving, at an application, a query indicator for a query of metamodel data that is hierarchically structured into sets of parent and child nodes and stored in a database accessed by the application via a network connection, the query indicator comprising a type of query and a value to be queried in the metamodel data;

performing the query, by the application and based on the query indicator, the performing of the query comprising recursive querying by the application of the sets of parent and child nodes in the metamodel data to identify a set of parent and child nodes in the metamodel data that includes the value, the application continuing to recursively call itself until a first one of the sets of parent and child nodes that includes the value to be queried is identified and ceasing to recursively call itself prior to completion of the recursive querying of all of the sets of parent and child nodes in the metamodel data, the ceasing occurring upon identification of the first one of the sets of parent and child nodes that includes the value to be queried; and providing, as a result, the value to be queried and at least one node from the one of the sets of parent and child nodes identified by the recursive query.

10. The system of claim 9, wherein receiving the query indicator further comprises receiving the query indicator in the form of a left curly brace.

11. The system of claim 9, wherein receiving the query indicator further comprises receiving the query indicator in the form of a right curly brace.

12. The system of claim 9, wherein providing the value to be queried further comprises providing the value to be queried to a user interface.

* * * * *